UNITED STATES PATENT OFFICE.

PIERCE B. WILSON, OF BALTIMORE, MARYLAND.

SEPARATION OF ZINC FROM GALENAS CARRYING SILVER AND METALLIC OXIDES AND SULPHIDES.

SPECIFICATION forming part of Letters Patent No. 305,031, dated September 9, 1884.

Application filed December 27, 1883. (No specimens.)

*To all whom it may concern:*

Be it known that I, PIERCE B. WILSON, of the city of Baltimore, and State of Maryland, have invented certain Improvements in the Separation of Zinc from Galenas Carrying Silver and Metallic Oxides and Sulphides, of which the following is a specification.

Great loss has been experienced in separating zinc from galenas carrying silver and metallic oxides and sulphides in ordinary smelting operations where the zinc is driven off by heat, owing to the escape of silver in the zinc vapor, and the expense of separating the silver from a solution of the zinc by precipitation through the medium of hydrogen sulphide obtained in the decomposition of some sulphide other than that found in the ore is so great as to render such process unprofitable.

My invention, therefore, consists in a chemical process for the above-named purpose, in which the hydrogen sulphide liberated in the decomposition of the sulphides contained in the ore is employed to precipitate the silver and lead from the zinc solution containing them.

In carrying out my improved process, I first place the ore, which consists of sulphide of lead, sulphide of zinc, and silver, in a suitable vessel, and add thereto dilute hydrochloric or other acid, which is heated by the application of steam to the vessel, or by other means, and agitate the mixture to assist in the dissolution of the zinc and the generation of hydrogen sulphide. In this operation a portion of the silver is also dissolved as a double chloride, or as a sulphate, if sulphuric acid is used, and to recover this silver is the ultimate object of the process. I next discharge the contents of this vessel to a second one, which, like the first, is heated to retain the lead chloride in solution. I next recharge the first-named vessel with an equivalency of ore and acid, and the hydrogen sulphide which is evolved is conducted through a suitable pipe to the contents of the second vessel, which consist at this time of the insoluble ores, gangue, and the soluble metals in solution. The introduction of hydrogen sulphide to the contents of the second vessel has the effect of precipitating the silver and lead as sulphides, the zinc remaining in solution. I then allow the contents of the second vessel to settle and discharge the supernatant liquid, which, as before stated, is a solution of zinc, to a third vessel, and wash the mixed sulphides to remove any zinc salts that remain. I next precipitate the zinc, as an oxide or oxycarbonate, with lime or any of the alkaline earths or their carbonates. The mixed sulphides are then removed from the second vessel and used in subsequent metallurgic operations.

I do not claim, broadly, the precipitation of metals from their solutions by means of hydrogen sulphide generated from the ores; neither do I claim, broadly, the separation of zinc from galenas carrying silver before smelting.

I claim as my invention—

The process of separating zinc from galenas carrying silver, which consists in first treating the ore in a suitable vessel with an acid to dissolve the zinc and generate hydrogen sulphide, then transferring the contents of the first vessel to a second, then recharging the first vessel with ore and acid, then conducting the hydrogen sulphide evolved in the first vessel to the solution of silver, lead, and zinc in the second to precipitate the silver and lead, and then separating the zinc solution from the precipitates, substantially as specified.

PIERCE B. WILSON.

Witnesses:
JOHN WILLIAMS,
CHAS. B. CASSADY.